(12) United States Patent
Hayashi et al.

(10) Patent No.: US 7,713,163 B2
(45) Date of Patent: May 11, 2010

(54) CONTROL SYSTEM FOR HYBRID VEHICLES

(75) Inventors: Koji Hayashi, Toyota (JP); Masatoshi Ito, Okazaki (JP); Hiroatsu Endo, Nagoya (JP); Tatsuya Ozeki, Torrance, CA (US)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 525 days.

(21) Appl. No.: 10/586,368

(22) PCT Filed: Jan. 18, 2005

(86) PCT No.: PCT/JP2005/000820

§ 371 (c)(1),
(2), (4) Date: Jan. 3, 2007

(87) PCT Pub. No.: WO2005/070717

PCT Pub. Date: Aug. 4, 2005

(65) Prior Publication Data

US 2008/0139360 A1    Jun. 12, 2008

(30) Foreign Application Priority Data

Jan. 22, 2004  (JP)  ............................. 2004-014318

(51) Int. Cl.
  *B60K 1/02*  (2006.01)
(52) U.S. Cl. .......................................................... 477/3
(58) Field of Classification Search .................... 477/2, 477/3
See application file for complete search history.

(56) References Cited

U.S. PATENT DOCUMENTS

| 3,623,568 | A | 11/1971 | Mori |
| 5,934,395 | A | 8/1999 | Koide et al. |
| 6,390,947 | B1 | 5/2002 | Aoki et al. |
| 6,510,370 | B1 * | 1/2003 | Suzuki et al. .................. 701/22 |
| 6,672,415 | B1 * | 1/2004 | Tabata ...................... 180/65.25 |
| 6,951,526 | B2 * | 10/2005 | Kuhstrebe et al. ............. 477/97 |
| 7,128,676 | B2 * | 10/2006 | Kinugasa et al. ............... 475/5 |
| 7,137,924 | B2 * | 11/2006 | Ito et al. ........................ 477/3 |
| 7,314,425 | B2 * | 1/2008 | Ito et al. ........................ 477/5 |
| 2002/0019691 | A1 * | 2/2002 | Matsubara et al. ............ 701/54 |
| 2003/0064854 | A1 * | 4/2003 | Kotani ........................... 477/3 |

(Continued)

FOREIGN PATENT DOCUMENTS

EP        1 336 773        8/2003

(Continued)

*Primary Examiner*—Ha D. Ho
(74) *Attorney, Agent, or Firm*—Oblon, Spivak, McClelland, Maier & Neustadt, L.L.P.

(57) ABSTRACT

A control system for hybrid vehicles, in which a second prime mover is connected to an output member to which a power is transmitted from a first prime mover through a transmission in which a torque capacity is varied in accordance with an oil pressure, and which has a first hydraulic pump driven by the first prime mover for establishing an oil pressure to be fed to the transmission, and a second hydraulic pump arranged in parallel with the first hydraulic pump and driven by an electric motor. A torque limiter limits an output torque of the second prime mover temporarily to a predetermined torque which is lower than a maximum output torque, at a starting time of the first prime mover.

5 Claims, 11 Drawing Sheets

U.S. PATENT DOCUMENTS

| | | |
|---|---|---|
| 2003/0078134 A1 | 4/2003 | Kojima et al. |
| 2003/0171187 A1 | 9/2003 | Aoki et al. |
| 2003/0171867 A1* | 9/2003 | Nakamori et al. ............. 701/54 |
| 2004/0084233 A1 | 5/2004 | Wakuta et al. |
| 2005/0124457 A1 | 6/2005 | Nakamori et al. |

FOREIGN PATENT DOCUMENTS

| | | |
|---|---|---|
| JP | 47-31773 | 8/1972 |
| JP | 47 31773 | 11/1972 |
| JP | 8 266012 | 10/1996 |
| JP | 10 212983 | 8/1998 |
| JP | 2000 230442 | 8/2000 |
| JP | 2000 308207 | 11/2000 |
| JP | 2001 41067 | 2/2001 |
| JP | 2001 112114 | 4/2001 |
| JP | 2002 89307 | 3/2002 |
| JP | 2002 118901 | 4/2002 |
| JP | 2002 155865 | 5/2002 |
| JP | 2002 225578 | 8/2002 |
| JP | 2003 205768 | 7/2003 |
| WO | 02 47931 | 6/2002 |

* cited by examiner

FIG.10
(A)
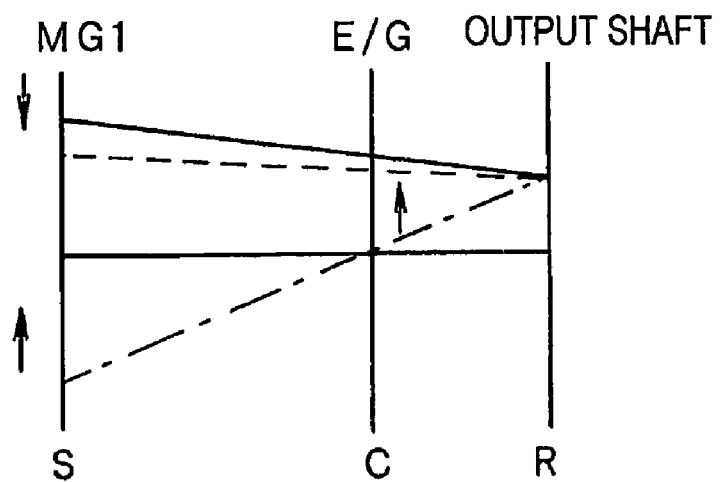
(B)
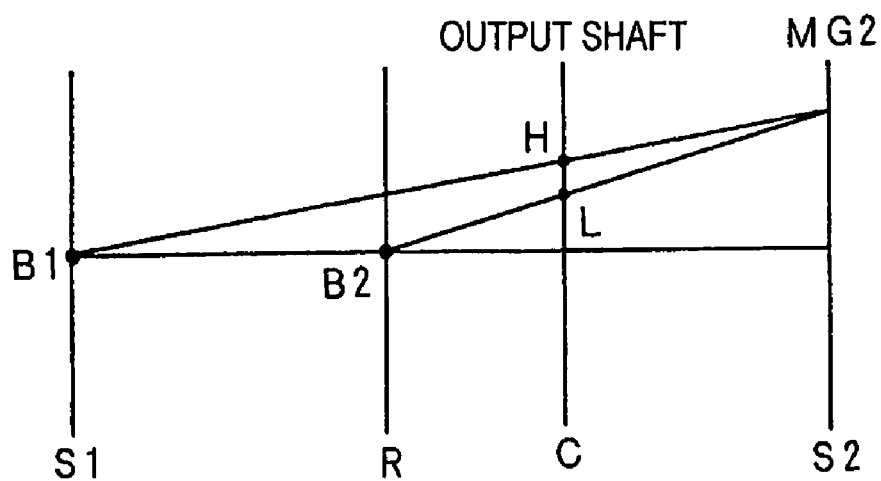

CONTROL SYSTEM FOR HYBRID VEHICLES

TECHNICAL FIELD

This invention relates to a control system for a hybrid vehicle in which a second prime mover is connected through a transmission to an output member to which a power is transmitted from a first prime mover and, more particularly, to a control system for a hybrid vehicle which has a hydraulic pump driven by the first prime mover and another independent hydraulic pump driven by an electric motor, and which is constructed to operate the transmission by an oil pressure established by those hydraulic pumps.

BACKGROUND ART

One example of the hybrid vehicle equipped with a so called "mechanical distribution type drive unit" is disclosed in Japanese Patent Laid-Open No. 2002-225578, and a construction thereof will be described briefly hereafter. In the disclosed hybrid vehicle, an engine torque is inputted to a carrier of a single pinion type planetary gear mechanism which constitutes a distributing mechanism, a first motor generator is connected to a sun gear, and an output member such as a counter drive gear etc. is connected to a ring gear. A second motor generator is connected to the output member or the ring gear through a transmission. The downshift when a clamping pressure for the belt is insufficient due to a shortage of the oil pressure or the like.

On the other hand, in Japanese Patent Laid-Open No. 2000-230442, there is disclosed an invention, which is constructed to inhibit halt of the engine and to establish an oil pressure by a mechanical oil pump in a hybrid vehicle having the mechanical oil pump and an electric oil pump, in case a cumulative load obtained on the basis of a cumulative operating time, a cumulative number of revolution and so on of the electric oil pump exceeds a durable load. In addition, in Japanese Patent Laid-Open No. 2001-112114, there is disclosed an invention, which is constructed to restrict an operation of an electric motor, in case an operating state of the electric motor exceeds a preset heat rating.

As described above, a hybrid vehicle comprises a plurality of prime movers such as an engine and an electric motor, and is capable of running using not only both of those prime movers, but also using any one of those prime movers. Accordingly, in order to ensure the oil pressure when the engine is halted, it is conceivable to provide an electric hydraulic pump which is capable of generating the oil pressure even when the engine is halted, in addition to a hydraulic pump which is driven by the engine. In the construction disclosed in the aforementioned Japanese Patent Laid-Open No. 2002-225578, the transmission is arranged between the second motor generator and the output member. In this construction, in case of running the vehicle by using the second motor generator as the prime mover, the mechanical oil pump is halted in accordance with a cessation of the engine. Therefore, it is necessary to feed the oil pressure to the transmission by driving the electric hydraulic pump so as to put the transmission into a torque transmittable state. In this state, it is required that the oil pressure corresponding to the torque which can maintain the running of the vehicle by the second motor generator, so that it is sufficient for the electric hydraulic pump to have such capacity. As a result of this, the entire construction of the hybrid vehicle can be downsized.

However, according to the construction disclosed in Japanese Patent Laid-Open No. 2002-225578, in case the engine is started due to increase of a demand torque and so on, the first motor generator is operated as the motor so as to carry out a motoring (i.e., or cranking) of the engine by using the motive power, but the torque of the first motor generator is transmitted to the engine through the distributing mechanism composed of the planetary gear mechanism, so that the torque acts on the output member in the direction to rotate the output member backward. Accordingly, it is desirable to output the torque further from the second motor generator at the starting time of the engine, so as to countervail the torque acting on the output member as a result of the motoring by the first motor generator. The torque outputted from the second motor generator at the motoring time is to be added to the torque of the second motor generator to run the vehicle. Therefore, the torque larger than that in the case of running the vehicle by the second motor generator acts on the transmission. It is necessary to raise the oil pressure in order to enable the transmission to transmit the torque sufficiently, even under such condition. However, if the oil pressure is outputted only by the electric hydraulic pump, there arise an disadvantage in that the electric hydraulic pump grows in size. Moreover, since an electric power is supplied from a power source such as the battery to both the first motor generator for the motoring and the electric hydraulic pump simultaneously, there is another disadvantage in that a load on an electric power source increases.

On the other hand, the oil pressure can be established sufficiently when the mechanical oil pump is driven by the engine, so that it is unnecessary to drive the electric hydraulic pump. Therefore, according to the invention disclosed in Japanese Patent Laid-Open No. 2001-41067, in which the electric pump is driven prior to halt the engine, if the electric pump is driven when the mechanical pump is driven by the engine and generating sufficient oil pressure, the oil pressure is generated excessively, and may cause a power loss. Moreover, in case the electric hydraulic pump is provided as a supplemental means to the mechanical oil pump driven by the engine, it is desirable for the electric hydraulic pump to have a required minimum capacity so as to minimize its size. However, the oil pressure is required in various situations, and there may be a case in which the oil pressure higher than the permissible limit of the electric hydraulic pump is required. Therefore, there is room for developing an effective means for determining the permissible limit of the electric hydraulic pump or controlling when the permissible limit is determined.

DISCLOSURE OF THE INVENTION

The present invention has been conceived noting the technical problems thus far described, and its object is to provide a control system which is capable of controlling at least two hydraulic pumps arranged in a hybrid vehicle, without increasing the power loss, or causing a shortage of the oil pressure.

According to the present invention, therefore, there is provided a control system for a hybrid vehicle, in which a second prime mover is connected to an output member to which a power is transmitted from a first prime mover through a transmission in which a torque capacity is varied in accordance with an oil pressure; and which has a first hydraulic pump driven by the first prime mover for establishing the oil pressure to be fed to the transmission, and a second hydraulic pump arranged in parallel with the first hydraulic pump and driven by an electric motor, characterized by comprising a torque limiting means for limiting an output torque of the second prime mover temporarily. The torque limitation may be executed by limiting the torque to a predetermined torque which is lower than a maximum output torque.

It is possible to raise a line pressure as an initial pressure of the oil pressure when starting up the first prime mover, and to lower the line pressure when the startup is completed.

Additionally, the limitation of the output torque of the second prime mover is lifted when the oil pressure of the first hydraulic pump is sufficiently raised by starting up the first prime mover.

Various kinds of construction can be adopted as the aforementioned first prime mover. For example, it is possible to adopt a construction in which an internal combustion engine and a motor generator are connected through a gear mechanism for performing a differential action. The gear mechanism may be a planetary gear mechanism.

A gear ratio possible to set in the transmission is discretional, however, the transmission, which can set two kinds of gear ratio such as high and low gear ratios may be adopted. In this case, a Ravigneaux type planetary gear mechanism may be used.

According to the control system of the invention, therefore, the output torque of the second prime mover is limited temporarily when starting up the first prime mover. Accordingly, the torque to be inputted to the transmission from the second prime mover is limited even if the startup of the first motor generator has not been completed and therefore the second hydraulic pump is generating the oil pressure. Consequently, the oil pressure required or demanded by the transmission is not raised so high. As a result, relative insufficiency of the oil pressure can be avoided.

In addition to the above construction, the present invention is characterized by further comprising a hydraulic pump drive means for driving the second hydraulic pump when the first prime mover is halted.

According to the control system thus constructed, therefore, the oil pressure required by the transmission is established by the second hydraulic pump in case of starting the halted first prime mover, and the transmission is set to a predetermined torque capacity by the oil pressure of the second hydraulic pump also in case of raising the output torque of the second prime mover during a process of starting up the first prime mover. However, the output torque of the second prime mover is limited temporarily as mentioned above, so that an amount of an operating oil to be required may be relatively small. As a result, relatively small capacity is sufficient for the second hydraulic pump, so that it is possible to downsize the second hydraulic pump.

According to the present invention, moreover, there is provided a control system for a hybrid vehicle, wherein the first prime mover includes an internal combustion engine which is started by the motoring by an external force, and characterized by further comprising a hydraulic pump halting means for halting the second hydraulic pump after complete combustion in the internal combustion engine is determined.

The complete combustion in the internal combustion engine can be determined on the basis of changes in the speed and a current value of the motor for motoring the internal combustion engine.

According to the present invention, in case of starting the internal combustion engine as the first prime mover, the second hydraulic pump is halted in accordance with the determination of the complete combustion in the internal combustion engine. Therefore, the second hydraulic pump is halted at about the same time as the first hydraulic pump starts to generate the sufficient oil pressure in connection with the complete combustion in the internal combustion engine. As a result, a time period of driving the second hydraulic pump unnecessarily is minimized as short as possible, so that the power loss can be avoided or reduced.

Still moreover, according to the present invention, a control system for a hybrid vehicle of any of the aforementioned inventions can further comprise a halt control means for halting the first prime mover after driving the second hydraulic pump, in case of halting the first prime mover when the transmission is set to the predetermined torque capacity by the oil pressure fed from the first hydraulic pump.

After the first prime mover is halted, a control is made to run the vehicle by the second prime mover. Additionally, it is possible to determine the driving of the second hydraulic pump or the driving state thereof on the basis of the speed and the current value of the electric motor.

In addition to the aforementioned functions, according to the present invention, the first prime mover is halted after driving the second hydraulic pump in case of halting the first prime mover. Therefore, it is possible to ensure the oil pressure by the second hydraulic pump even in case the first hydraulic pump does not generate the oil pressure resulting from halt of the first prime mover. Accordingly, the torque from the second prime mover can be transmitted certainly to the output member by the transmission.

Moreover, according to the present invention, a control system for a hybrid vehicle of any of the aforementioned inventions can further comprise a hydraulic pump drive determining means for determining a change of driving state of the first hydraulic pump resulting from switching of the operating state of the first prime mover from the halting state to the driving state, on the basis of the operating state of the second hydraulic pump.

With this construction, in case of starting up the first prime mover, the first hydraulic pump is driven by the first prime mover to establish the oil pressure, and this state is determined on the basis of the operating state of the second hydraulic pump such as the speed, the current value or the like. Therefore, the buildup of oil pressure by the first hydraulic pump can be determined without delay. Consequently, the situation in that the second hydraulic pump is driven unnecessarily can be avoided.

Furthermore, the control system for a hybrid vehicle according to the present invention can also comprises: a load accumulating means for accumulating a load depending on a line pressure of the transmission fed by the second hydraulic pump and an oil temperature for every preset time, and for subtracting preset value from a cumulative value of the load in case the second hydraulic pump is halted; and a drive control means for inhibiting the halt of the first prime mover in case the cumulative value of the load exceeds a preset value, and for allowing the halt of the first prime mover in case the cumulative value of the load becomes smaller than another preset value.

According to the invention thus constructed, the load on the second hydraulic pump is accumulated on the basis of the amount of the operating oil to be generated by the second hydraulic pump, and the temperature thereof. In case the cumulative value exceeds the preset value, the halt of the first prime mover is inhibited and the oil pressure is generated by the first hydraulic pump. In the meantime, the second hydraulic pump is halted and the cumulative value is subtracted. Consequently, since the halt of the first prime mover is allowed when the cumulative value becomes smaller than the preset value, the second hydraulic pump can be driven continuously as long as possible within the permissible limit, and an insufficiency of the oil pressure and a growth in size of the second hydraulic pump can be avoided.

BRIEF DESCRIPTION OF THE DRAWINGS

FIG. 10 is a nomographic diagram on the individual planetary gear mechanism in the drive unit.

BEST MODE FOR CARRYING OUT THE INVENTION

Figure 8:
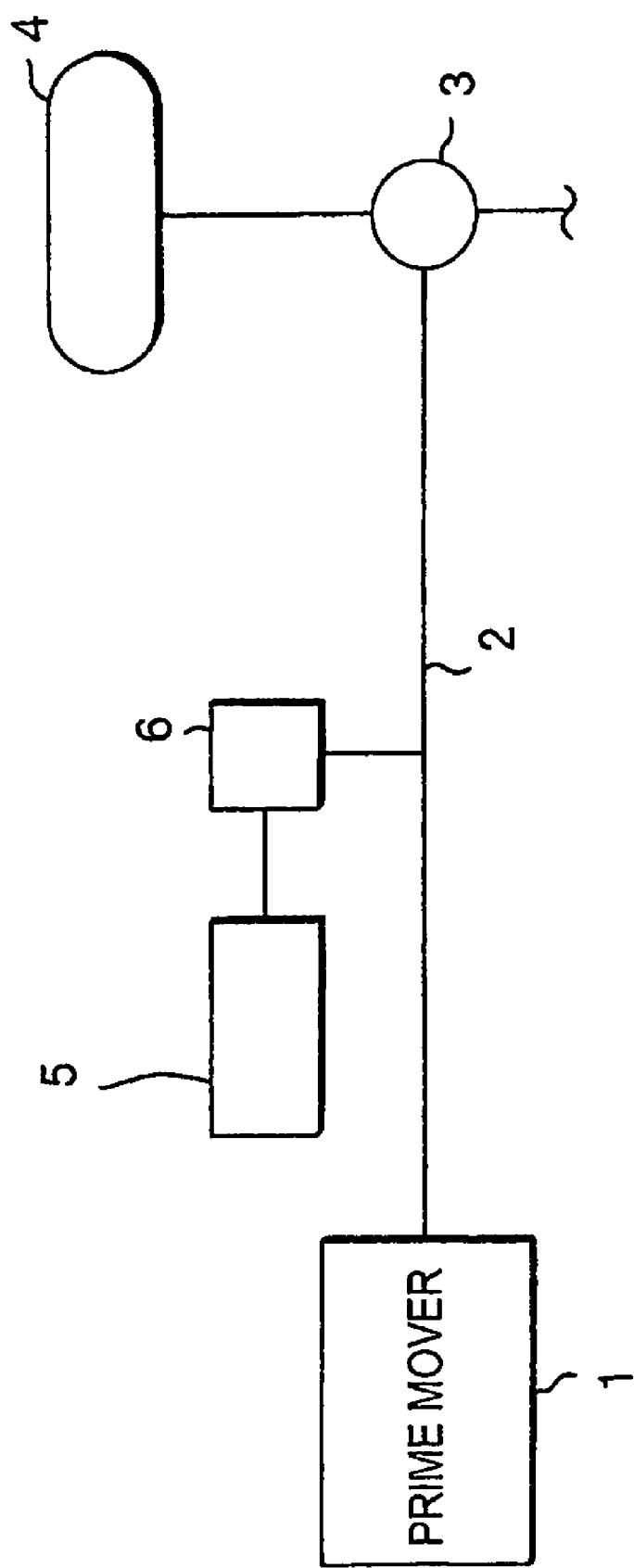
FIG. 8 is a schematic diagram showing one example of a drive unit in a hybrid vehicle to which the invention is applied.

This invention will be described in connection with its specific examples. A hybrid drive unit to which this invention is applied will be, described first. The intended hybrid drive unit in this invention is, for example, mounted on a vehicle. As shown in FIG. 8, the torque of a main prime mover 1 (i.e., a first prime mover) is transmitted to an output member 2, from which the torque is transmitted through a differential 3 to drive wheels 4. On the other hand, there is provided an assist prime mover (i.e., a second prime mover) 5, which can make a power control to output a driving force for a drive and a regenerative control to recover energy. This assist prime mover 5 is connected through a transmission 6 to the output member 2. Between the assist prime mover 5 and the output member 2, therefore, the transmission torque capacity is increased/decreased according to a gear ratio to be set by the transmission 6.

This transmission 6 can be constructed to set the gear ratio at "1" or higher. With this construction, at the power running time for the assist prime mover 5 to output the torque, this torque can be outputted to the output member 2 so that the assist prime mover 5 can be made to have a low capacity or a small size. However, it is preferred that the running efficiency of the assist prime mover 5 is kept in a satisfactory state. In case the speed of the output member 2 rises according to the vehicle speed, for example, the gear ratio is lowered to decrease the speed of the assist prime mover 5. In case the speed of the output member 2 drops, on the other hand, the gear ratio may be raised.

Figure 9:
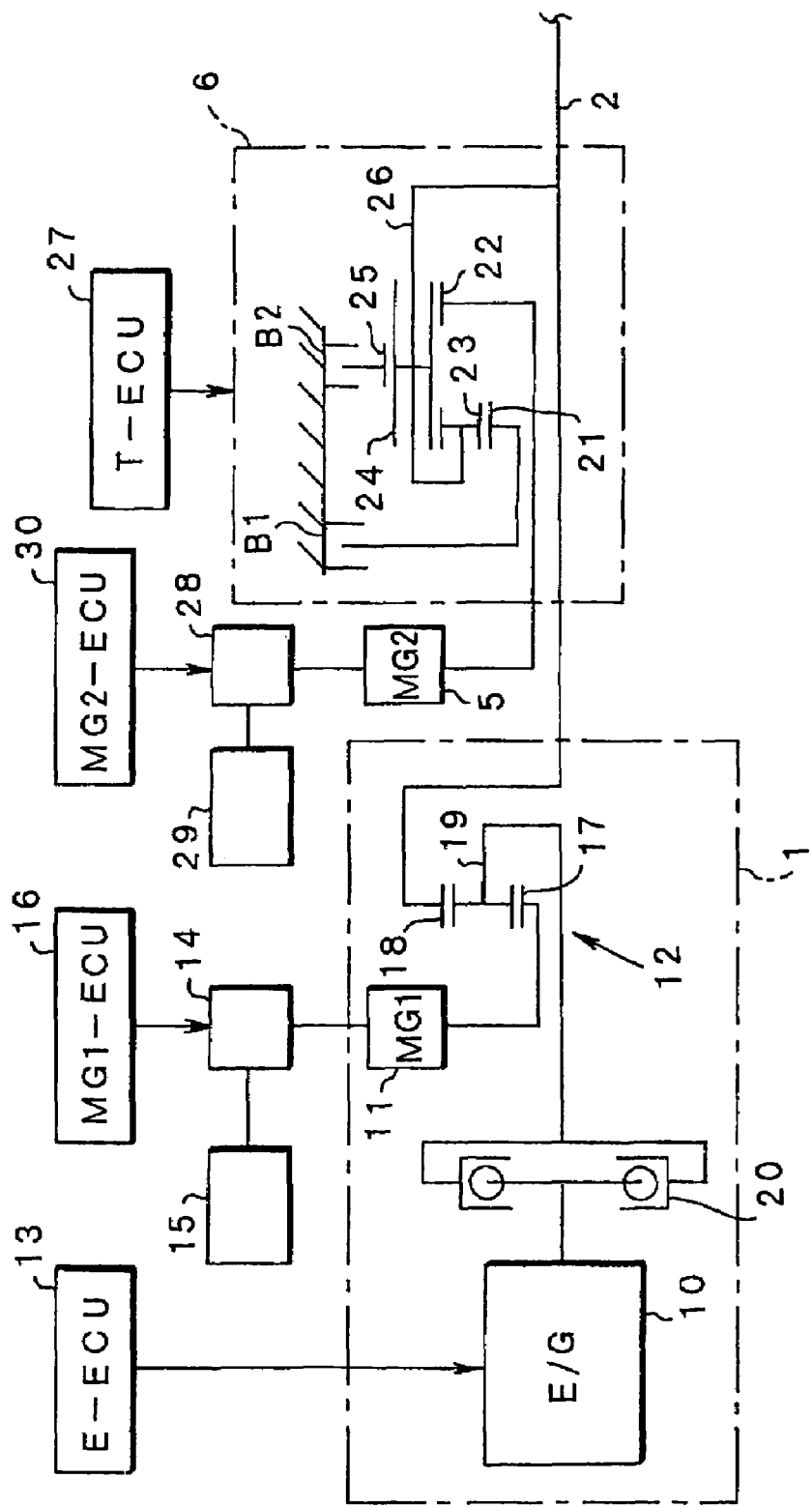
FIG. 9 is a schematic diagram showing the drive unit more specifically.

The aforementioned hybrid drive unit will be described more specifically. As shown in FIG. 9, the main prime mover 1 is mainly constructed to include an internal combustion engine 10 (as will be called the "engine"), a motor generator (as will be tentatively called the "first motor generator" or "MG 1") 11, and a planetary gear mechanism 12 for synthesizing or distributing the torque between the engine 10 and the first motor generator 11. The engine 10 is a well-known power unit such as a gasoline engine or a diesel engine for outputting a power by burning a fuel, and is so constructed that its running state such as the degree of throttle opening (or the air intake amount), the fuel feed amount or the ignition timing can be electrically controlled. This control is made by an electronic control unit (E-ECU) 13 composed mainly of a microcomputer, for example.

On the other hand, the first motor generator 11 is exemplified by a permanent magnet type synchronous electric motor and is constructed to function as an electric motor and a dynamo. The first motor generator 11 is connected through an inverter 14 with an accumulator device 15 such as a battery. By controlling the inverter 14, moreover, the output torque or the regenerative torque of the first motor generator 11 is suitably set. For this control, there is provided an electronic control unit (MG1-ECU) 16, which is composed mainly of a microcomputer. Here, a stator (a stator not shown) of the first motor generator 11 is so fixed as not to rotate.

Moreover, the planetary gear mechanism 12 is a well-known one for establishing a differential action with three rotary elements: a sun gear 17 or an external gear; a ring gear 18 or an internal gear arranged concentrically with the sun gear 17; and a carrier 19 holding a pinion gear meshing with those sun gear 17 and ring gear 18 such that the pinion gear may rotate on its axis and revolve around the carrier 19. The engine 10 has its output shaft connected through a damper 20 to that carrier 19 as a first rotary element. In other words, the carrier 19 acts as an input element.

On the other hand, a rotor (rotor not shown) of the first motor generator 11 is connected to the sun gear 17 as a second rotary element. Therefore, this sun gear 17 is the so-called "reaction element", and the ring gear 18 as a third rotary element is the output element. And, this ring gear 18 is connected to the output member (i.e., the output shaft) 2.

In the example shown in FIG. 9, on the other hand, the transmission 6 is constructed of one set of Ravignaux type planetary gear mechanisms. The planetary gear mechanism is provided with external gears, i.e., a first sun gear (S1) 21 and a second sun gear (S2), of which the first sun gear 21 meshes with a first pinion 23, which meshes with a second pinion 24, which meshes with a ring gear (R) 25 arranged concentrically with the individual sun gears 21 and 22. Here, the individual pinions 23 and 24 are so held by a carrier (C) 26 as to rotate on their axes and to revolve around the carrier 26. Moreover, the second sun gear 22 meshes with the second pinion 24. Thus, the first sun gear 21 and the ring gear 25 construct a mechanism corresponding to a double-pinion type planetary gear mechanism together with the individual pinions 23 and 24, and the second sun gear 22 and the ring gear 25 construct a mechanism corresponding to a single pinion type planetary gear mechanism together with the second pinion 24.

There are also provided a first brake B1 for fixing the first sun gear 21 selectively, and a second brake B2 for fixing the ring gear 25 selectively. These brakes B1 and B2 are the so-called "frictional engagement devices" for establishing engaging forces by frictional forces, and can adopt a multi-disc engagement device or a band type engagement device. The brakes B1 and B2 are constructed to change their torque capacities continuously according to the engaging forces of oil pressures. Moreover, the aforementioned assist prime mover 5 is connected to the second sun gear 22, and the carrier 26 is connected to the output shaft 2.

In the transmission 6 thus far described, therefore, the second sun gear 22 is the so-called "input element", and the carrier 26 is the output element. The transmission 6 is constructed to set high gear stages of gear ratios higher than "1" by applying the first brake B1, and to set low gear stages of gear ratios higher than those of the high gear stages by applying the second brake B2 in place of the first brake B1. The shifting operations between those individual gear stages are executed on the basis of a running state such as a vehicle speed or a drive demand (or the degree of accelerator opening). More specifically, the shifting operations are controlled by predetermining gear stage regions as a map (or a shifting diagram) and by setting any of the gear stages according to the detected running state. For these controls, there is provided an electronic control unit (T-ECU) 27, which is composed mainly of a microcomputer.

Here in the example shown in FIG. 9, there is adopted a motor generator (as will be tentatively called the "second motor generator" or "MG2") as the assist prime mover 5, which can have the power mode to output the torque and the regenerative mode to recover the energy. This second motor generator 5 is exemplified by a permanent magnet type synchronous electric motor, and its rotor (a rotor not shown) is connected to the second sun gear 22. Also, the second motor generator 5 is connected through an inverter 28 with a battery 29. Moreover, the motor generator 5 is constructed to control the power mode, the regenerative mode and the torques in the individual modes by controlling the inverter 28 with an electronic control unit (MG2-ECU) 30 composed mainly of a microcomputer. Here, the battery 29 and the electronic control unit 30 can also be integrated with the inverter 14 and the battery (the accumulator device) 15 for the aforementioned first motor generator 11. Here, a stator (a stator not shown) of the second motor generator 5 is so fixed as not to rotate.

A nomographic diagram of the single pinion type planetary gear mechanism 12 as the aforementioned torque synthesizing/distributing mechanism is present at (A) in FIG. 10. When the reaction torque by the first motor generator 11 is inputted to the sun gear (S) 17 against the torque to be inputted to the carrier (C) 19 and outputted by the engine 10, a torque in the magnitude derived from an addition or subtraction of those torque appears at the ring gear (R) 18 acting as the output element. In this case, the rotor of the first motor generator 11 is rotated by this torque, and the first motor generator 11 functions as a dynamo. With the speed (or the output speed) of the ring gear 18 being constant, on the other hand, the speed of the engine 10 can be continuously (or without any step) changed by increasing/decreasing the speed of the first motor generator 11. Specifically, the control for setting the speed of the engine 10 at a value for the best fuel economy can be made by controlling the first motor generator 11.

As indicated by a chain line in FIG. 10 (A), moreover, the first motor generator 11 rotates backward when the engine 10 is halted while the vehicle is running. In this state, if the torque is outputted in a forward direction by operating the first motor generator 11 as the electric motor, the torque acts on the engine 10 connected to the carrier 19 to rotate it in the forward direction. As a result, the engine 10 can be started (i.e., motored or cranked) by the first motor generator 11. In this case, the torque acts on the output shaft 2 in the direction to stop the rotation of the output shaft 2. Therefore, the driving torque for running can be maintained by controlling the torque outputted from the second motor generator 5, and at the same time, the startup of the engine 10 can be executed smoothly. Here, the hybrid type of this kind is called "mechanical distribution type" or "split type".

On the other hand, a nomographic diagram of the Ravignaux type planetary gear mechanism constructing the transmission 6 is presented at (B) in FIG. 10. When the ring gear 25 is fixed by the second brake B2, a low gear stage L is set so that the torque outputted from the second motor generator 5 is amplified according to the gear ratio and applied to the output shaft 2. When the first sun gear 21 is fixed by the first brake B1, on the other hand, there is set a high gear stage H having a lower gear ratio than that of the low gear stage L. The gear ratio at this high gear stage is higher than "1" so that the torque outputted by the second motor generator 5 is augmented according to that gear ratio and applied to the output shaft 2.

Here, in the state where the individual gear stages L and H are steadily set, the torque to be applied to the output shaft 2 is such one as is augmented from the output torque of the second motor generator 5 according to the gear ratio. In the shifting transitional state, however, the torque is such one as is influenced by the torque capacities at the individual brakes B1 and B2 and by the inertia torque accompanying the speed change. On the other hand, the torque to be applied to the output shaft 2 is positive in the drive state of the second motor generator 5 but negative in the driven state.

Figure 11:
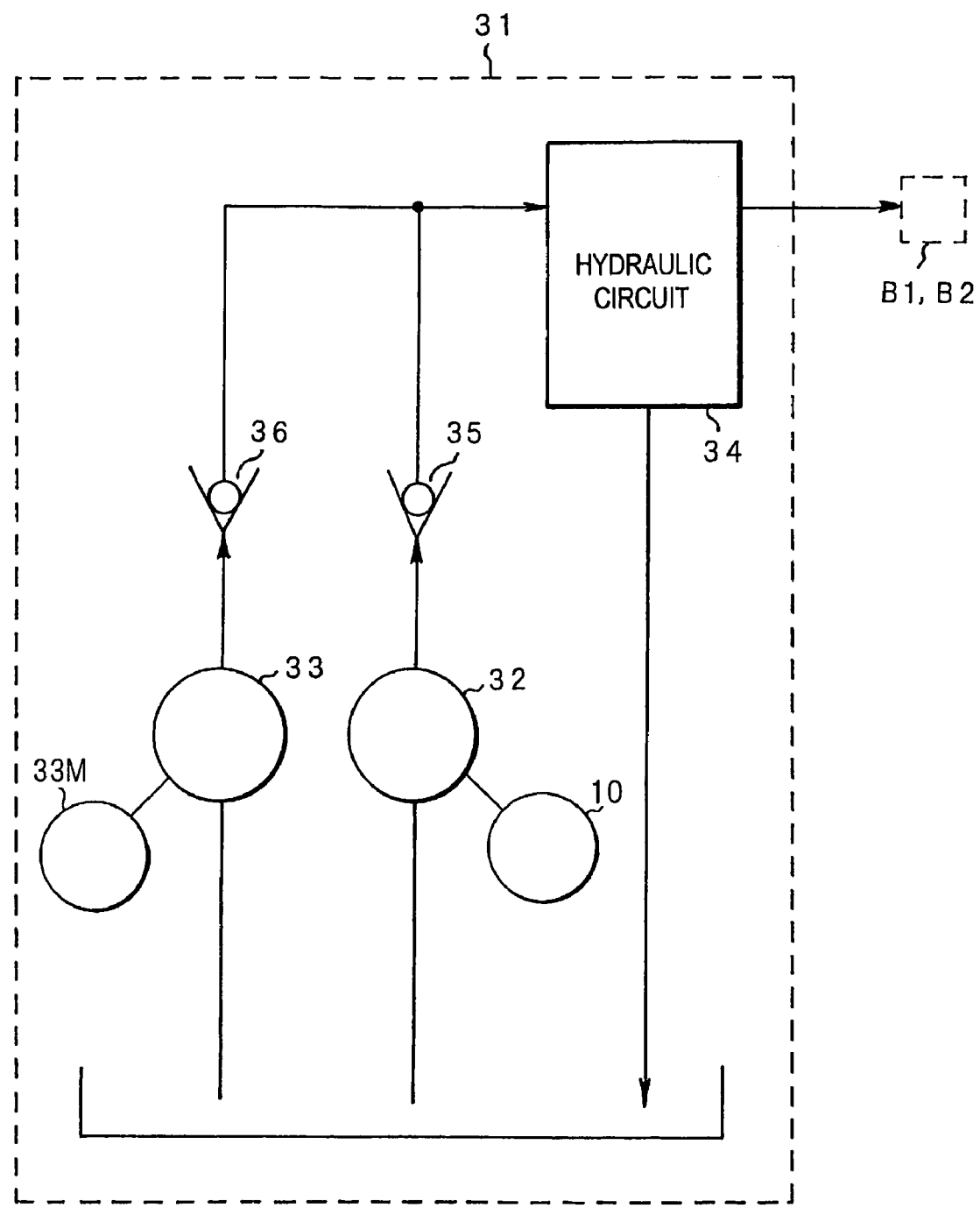
FIG. 11 is a diagram schematically showing a parallel connecting state between a mechanical oil pump and an electric oil pump.

There is provided a hydraulic control system 31 for controlling the engagement/release of the aforementioned individual brakes B1 and B2 by feeding/discharging the oil pressure thereto/therefrom. As shown in FIG. 11, the hydraulic control system 31 comprises a mechanical oil pump 32, an electric oil pump 33, and a hydraulic circuit 34. The hydraulic circuit 34 is constructed to regulate an oil pressure established by those oil pumps 32 and 33 to a line pressure, to feed and discharge the oil pressure regulated from the line pressure as an initial pressure to/from the brakes B1 and B2, and to feed a lubrication oil to requiring portions. The mechanical oil pump 32 is driven by the engine 10 to generate the oil pressure, and is arranged e.g., in an output side of the damper 20 and coaxially therewith. The mechanical oil pump 32 is operated by the torque of the engine 10. On the other hand, the electric oil pump 33 is driven by a motor 33M, and is arranged at a suitable place such as an outside of a casing (casing not shown). The electric oil pump 33 is operated by an electric power from an electric accumulator such as a battery to generate oil pressure.

The hydraulic circuit 34 comprises a plurality of solenoid valves, change-over valves or pressure regulator valves (those are not shown), and the regulation and the feeding/discharging of the oil pressure can be controlled electrically. Here, there are provided check valves 35 and 36 on a discharging side of the individual oil pumps 32 and 33. Those check valves 35 and 36 are opened by a discharging pressure of those oil pumps 32 and 33, and closed in an opposite direction. The oil pumps 32 and 33 are connected to the hydraulic circuit 34 and those pumps are arranged in parallel with each other. In addition, a valve for regulating the line pressure (a valve not shown) controls the line pressure into two stages, such as a high pressure stage by increasing the discharging amount, and a low pressure stage by decreasing the discharging amount.

The aforementioned hybrid drive unit comprises two prime movers such as the main prime mover 1 and the assist prime mover 5. The vehicle runs at low fuel consumption and at low emission by making good use of those prime movers. Even in case of driving the engine 10, moreover, the speed of the engine 10 is controlled at the optimum fuel consumption by the first motor generator 11. Moreover, inertia energy of the vehicle is regenerated as electric power at the coasting time. In case the torque is assisted by driving the second motor generator 5, the torque to be added to the output shaft 2 is augmented by setting the transmission 6 at the low gear stage L, when the vehicle speed is low. On the other hand, the speed of the second motor generator 5 is relatively lowered to reduce the loss by setting the transmission 6 at the high gear stage H when the vehicle speed is raised. Thus, the torque assist is carried out efficiently.

The aforementioned hybrid vehicle is capable of running by the power of the engine 10, by both of the engine 10 and the second motor generator 5, and only by the second motor generator 5. Those running pattern is determined and selected on the basis of drive demands represented by the accelerator opening, vehicle speed and so on. For example, in case the battery charge is sufficient and the drive demand is relatively small, or in case a quiet start is selected by a manual operation, the running pattern is selected which is similar to that of an electric vehicle (as will be tentatively called "EV running") using the second motor generator 5, and the engine 10 is halted. In this state, in case the drive demand is increased when e.g., the accelerator pedal is depressed deeply, in case the battery charge is decreased, or in case the running state is shifted from the quiet start to a normal running by the manual operation, the engine 10 is started and the running pattern is shifted to the running pattern using the engine 10 (as will be tentatively called "E/G running").

In the aforementioned example, a startup of the engine 10 is carried out by the first motor generator 11 functioning as the motor, and by transmitting the torque to the engine 10 through the planetary gear mechanism 12 so as to carry out the motoring (or a cranking). In this case, as shown in FIG. 10, if the torque is applied to the sun gear 17 by the first motor generator 11 in the direction to rotate the sun gear 17 forward, the torque acts on the ring gear 18 in the direction to rotate the ring gear 18 backward. Since the ring gear 18 is connected to the output shaft 2, the torque involved in the startup of the engine 10 acts in the direction to reduce the vehicle speed. At the startup of the engine 10, therefore, the torque is outputted from the second motor generator 5 in order to countervail a so-called "reaction torque".

The torque to be applied to the transmission 6, more specifically, the torque to be applied to any one of the brakes B1 and B2 which are in engagement at the time so as to set the gear stage is augmented transiently due to augmentation of the output torque of the second motor generator 5 at the starting time of the engine 10. Therefore, in the control system or the control method according to the invention, the following control is made in accordance with the startup of the engine 10.

Figure 1:
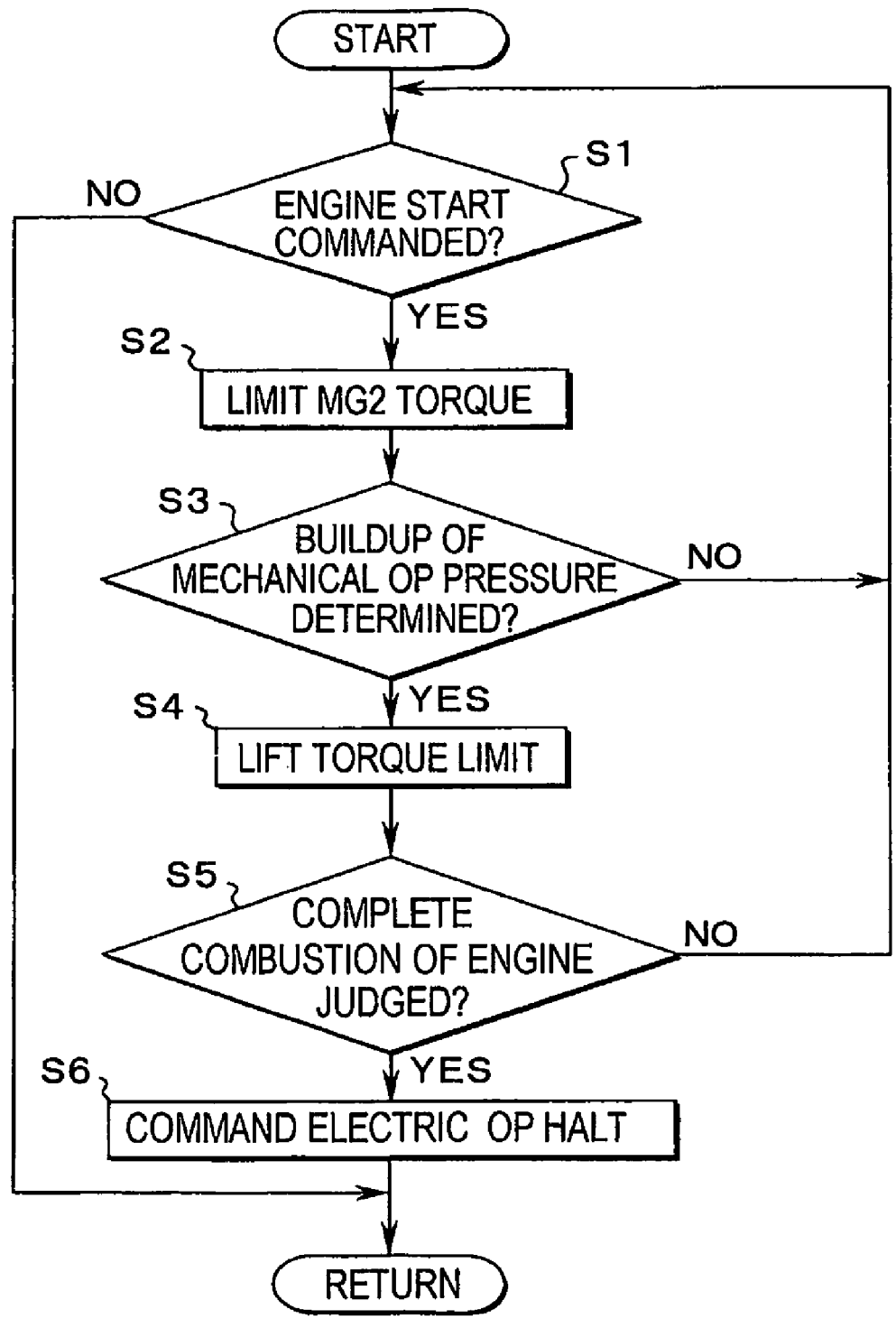
FIG. 1 is a flow chart for explaining a control example at an engine starting time by a control system of this invention.

FIG. 1 is a flowchart for explaining an example of the control to shift the running pattern from EV running to the running with the engine 10. The electric oil pump 33 is driven to generate an oil pressure at the starting instant of this control, and the generated oil pressure is regulated to the line pressure by the hydraulic control system 31 and fed to any one of the brakes B1 and B2 in the transmission 6. Also, the second motor generator 5 is driven as the electric motor to output the torque, and the outputted torque is transmitted to the output shaft 2 through the transmission 6, thereby running the vehicle. The line pressure to be fed to the transmission 6, which is set to two stages such as high stage and low stage, is set to a low pressure Lo in this steady running state. In this EV running state, first of all, it is judged (at Step S1) whether or not the starting of the engine 10 has been commanded. If the demand torque is augmented by some factors such that the accelerator pedal (a pedal not shown) is depressed deeply by a driver at EV running, the running pattern is shifted to E/G running so as to output the demanded driving torque. Thus, at Step S1, it is judged whether or not the start of the engine 10 has been commanded in connection with a decision to shift the running state.

In case the answer of Step S1 is NO, the routine is once ended without carrying out any especial control. On the contrary, in case the answer of Step S1 is YES, the output torque of the second motor generator 5 (MG2 torque) is limited temporarily to a preset value (at Step S2). Here, in this case, the output torque of the second motor generator 5 is augmented, and the line pressure fed to the transmission 6 is switched to a relatively high pressure Hi. Also, an electric power is fed to the first motor generator 11 and the first motor generator 11 is activated as the electric motor, so as to carry out the motoring of the engine 10. The mechanical oil pump 32 is rotated in association with the motoring of the engine 10, but outputting pressure thereof starts rising after some delay.

Accordingly, the line pressure is built from the oil pressure generated by the electric oil pump 33 or an initial pressure. However, since the output torque of the second motor generator 5 connected to the input side of the transmission 6 is limited, it is unnecessary for the electric oil pump 33 to generate particularly high torque. As a result of this, a protection of the electric oil pump 33 can be attained, and an electric oil pump having a relatively small capacity can be adopted as the electric oil pump 33.

Then, a build up of the oil pressure by the mechanical oil pump 32 (or a mechanical OP) driven by the engine 10 is determined (at Step S3). Since the electric oil pump 33 and the mechanical oil pump 32 are connected in parallel with each other, as illustrated in FIG. 11, the output pressure of one oil pump impinges on that of other oil pump. Therefore, when the mechanical oil pump 32 is rotated in association with the motoring of the engine 10, output pressure thereof rises gradually and, consequently, the oil pressure of the discharging side of the electric oil pump 33, more specifically, the oil pressure of the discharging side of the check valve 36 is raised. As a result, the speed of the electric oil pump 33 drops, and a current value increases due to a resultant drop in a back electromotive force. Therefore, the buildup of the oil pressure by the mechanical oil pump 32 can be determined on the basis of operating states of the electric oil pump 33, such as the speed, the current value and so on.

In case the oil pressure by the mechanical oil pump 32 has not been sufficiently raised yet so that the answer of Step S3 is NO, the routine is returned to Step S1. On the contrary, in case the oil pressure by the mechanical oil pump 32 is sufficiently raised so that the answer of Step S3 is YES, the limitation of the output torque of the second motor generator 5 is lifted (at Step S4). This is because sufficiently high oil pressure and ample amounts of the operating oil are fed to the transmission 6 by the mechanical oil pump 32 through the hydraulic control system 31 so that the transmission 6 can transmit the output torque of the second motor generator 5 sufficiently even if the torque is raised.

The output torque of the second motor generator 5 is thus raised in the process of the motoring of the engine 10. Therefore, even if the torque acts on the output shaft 2 in the direction to rotate it backward when carrying out the motoring of the engine 10 by the first motor generator 11, the torque outputted from the second motor generator 5 countervails the so-called "reaction torque". Consequently, a significant change in torque and a resultant shock can be prevented or suppressed.

Then, a complete combustion of the engine 10 is determined (at Step S5). The complete combustion of the engine 10 means a state where a fuel is combusted continuously so that the engine 10 starts rotating autonomously. In the aforementioned hybrid drive unit, the first motor generator 11 carries out the motoring of the engine 10. Therefore, when the engine 10 falls in the complete combustion condition, the torque acting on the first motor generator 11 lowers and the speed thereof rises. Accordingly, the determination of the complete combustion of the engine 10 can be made on the basis of the speed and the change in the current value of the first motor generator 11.

In case the answer of Step S5 is NO, specifically, in case the engine has not reached the complete combustion yet, the routine is returned to Step S1 so as to continue the preceding controls. On the contrary, in case the engine 10 is in the complete combustion condition so that the answer of Step S5 is YES, a command for halting the electric oil pump 33 (or an electric OP) is outputted (at Step S6). This is because the operating oil is outputted in sufficient amounts by the mechanical oil pump 32 continuously due to autonomous rotation of the engine 10. Accordingly, a time period, in which the electric oil pump 33 consuming electric power is driven simultaneously with the mechanical oil pump 32, is minimized as short as possible. As a result, the energy loss can be prevented or suppressed without causing an insufficiency of the oil pressure. Here, the line pressure is brought back to the relatively low pressure Lo, and the output torque of the second motor generator 5 is lowered, after the determination of the complete combustion of the engine 10 is satisfied.

Figure 2:
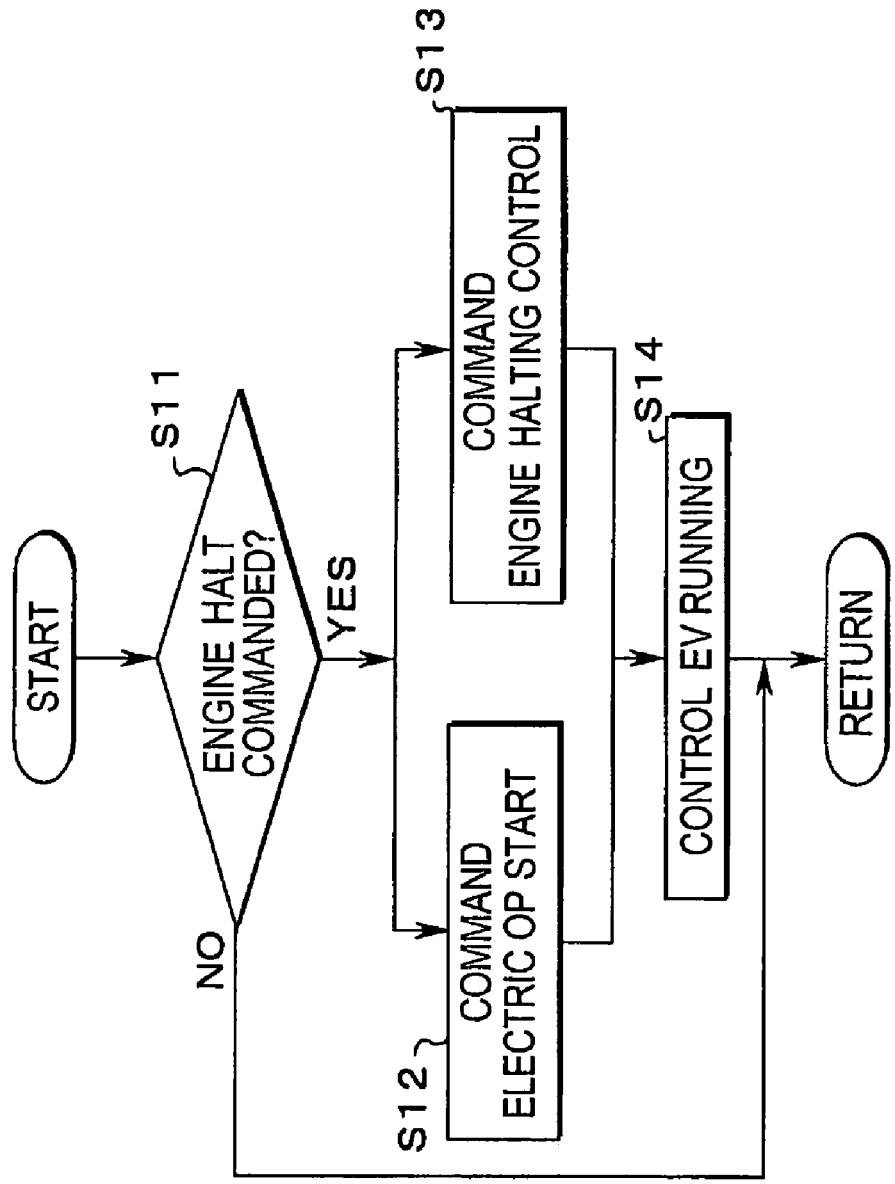
FIG. 2 is a flow chart for explaining a control example at an engine halting time by a control system of this invention.

Next, here will be described a control for shifting a running pattern from E/G running to EV running. As described above, the hybrid vehicle comprises the engine 10 and the second motor generator 5 as the prime movers. When a predetermined condition is satisfied, e.g., when an accelerator opening (i.e., a depression angle of the accelerator pedal) is reduced as the vehicle is running by using the engine 10, the engine 10 is halted and the second motor generator 5 is driven so that judgment of EV running is satisfied in which the second motor generator 5 is used. In this case, it is judged whether or not a command signal to halt the engine 10 has been outputted (at Step S11), as shown in FIG. 2. In case the answer of Step S11 is NO, the routine shown in FIG. 2 is once ended without carrying out any especial control. On the contrary, in case the answer of Step S11 is YES, a command signal to start the electric oil pump 33 is outputted (at Step S12), and a command signal to halt the engine 10 is outputted (at Step S13). Then, the control for EV running is carried out (at Step S14).

Figure 3:
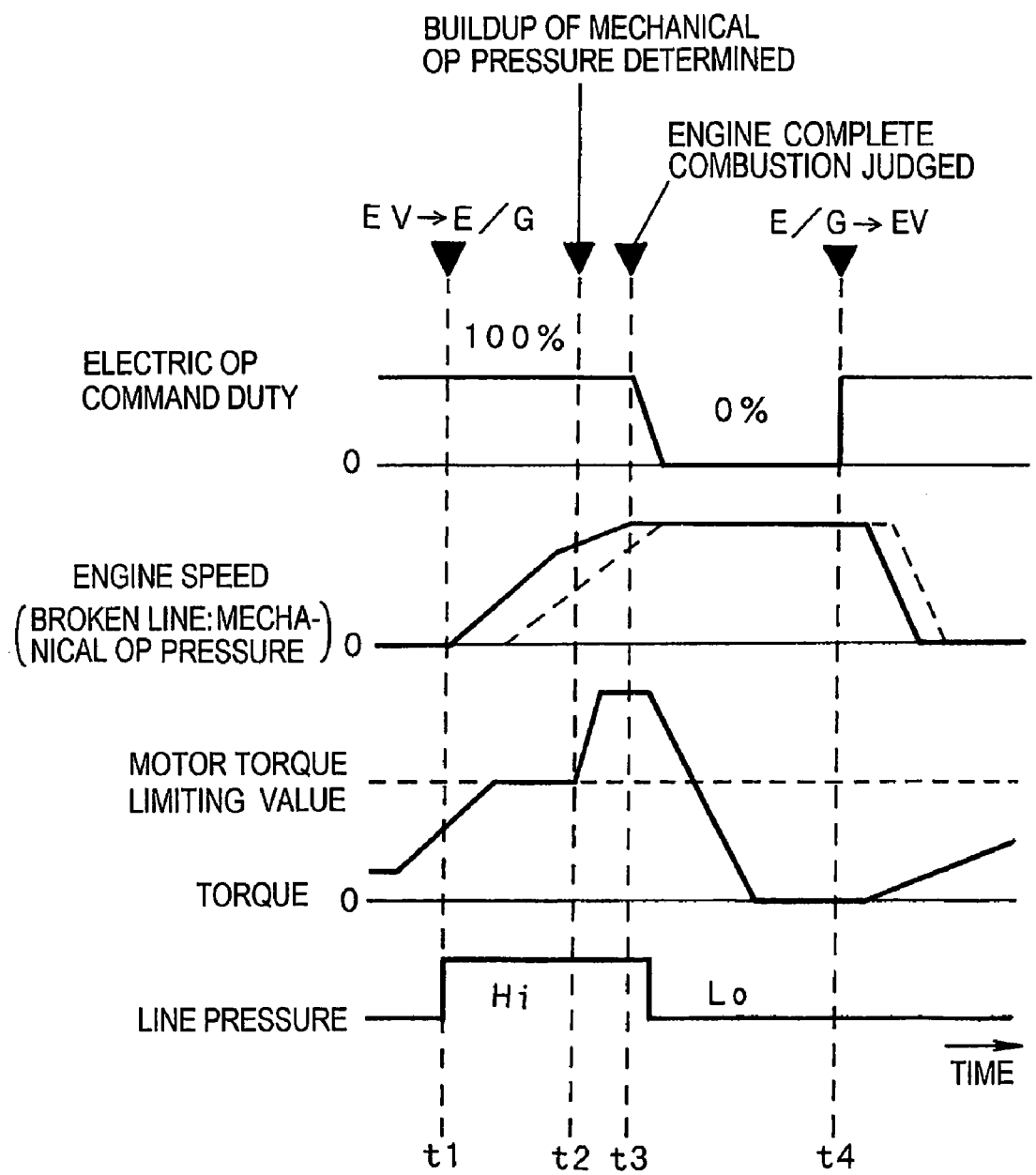
FIG. 3 is a time chart schematically showing changes in the operating state of an electric oil pump and an engine speed, at a shifting time from EV running to E/G running, and from E/G running to EV running.

In a time chart of FIG. 3, there are shown ON/OFF state of the electric oil pump 33, the engine speed, the speed of the second motor generator 5, the output torque of the second motor generator 5 and a change in the line pressure, at the aforementioned shifting time from EV running to E/G running, and at the shifting time from E/G running to EV running. A decision to shift to E/G running is satisfied (at a point of time t1) in the course of augment of the output torque of the second motor generator 5, resulting from increase of a demanded drive under EV running state in which, e.g., the accelerator pedal is depressed. At the same time, the line pressure is controlled to the relatively high pressure Hi, and the motoring (or the cranking) of the engine 10 by the first motor generator 11 is started. The running pattern is EV running, and the electric oil pump 33 is in ON state (i.e., in a state where a command duty ratio is 100%). However, a torque capacity of the transmission 6 established by the oil pressure generated by the electric oil pump 33 is insufficient for the maximum output torque of the second motor generator 5. Therefore, when the mechanical oil pump 32 does not generate the oil pressure sufficiently before the complete combustion of the engine 10, the output torque of the second motor generator 5 is limited to a preset value which is smaller than the maximum output torque.

The oil pressure established by the mechanical oil pump 32 is raised gradually due to the continuous motoring of the engine 10. When the oil pressure reaches the preset value, namely, when a determination of the buildup of the oil pressure of the mechanical oil pump 32 is satisfied (at a point of time t2), the limitation of the output torque of the second motor generator 5 is lifted and the output torque is raised to maximum. Then, the complete combustion of the engine 10 is determined (at a point of time t3), and a control to halt the electric oil pump 33 is commenced. In the example shown in FIG. 3, the command duty ratio of the electric oil pump 33 is reduced gradually. Right after this, the output torque is lowered to halt the second motor generator 5, and the line pressure is shifted to the relatively low pressure Lo.

On the other hand, in case of shifting the running pattern from E/G running to EV running, the electric oil pump 33 is switched to ON state (i.e., a state where a command duty ratio is 100%) when the decision to shift from E/G running to EV running is satisfied (at a point of time t4). At the same time, or right after this, the engine speed is gradually lowered, the oil pressure established by the mechanical oil pump 32 is gradually lowered, and the output torque of the second motor generator 5 is gradually augmented.

Figure 4:
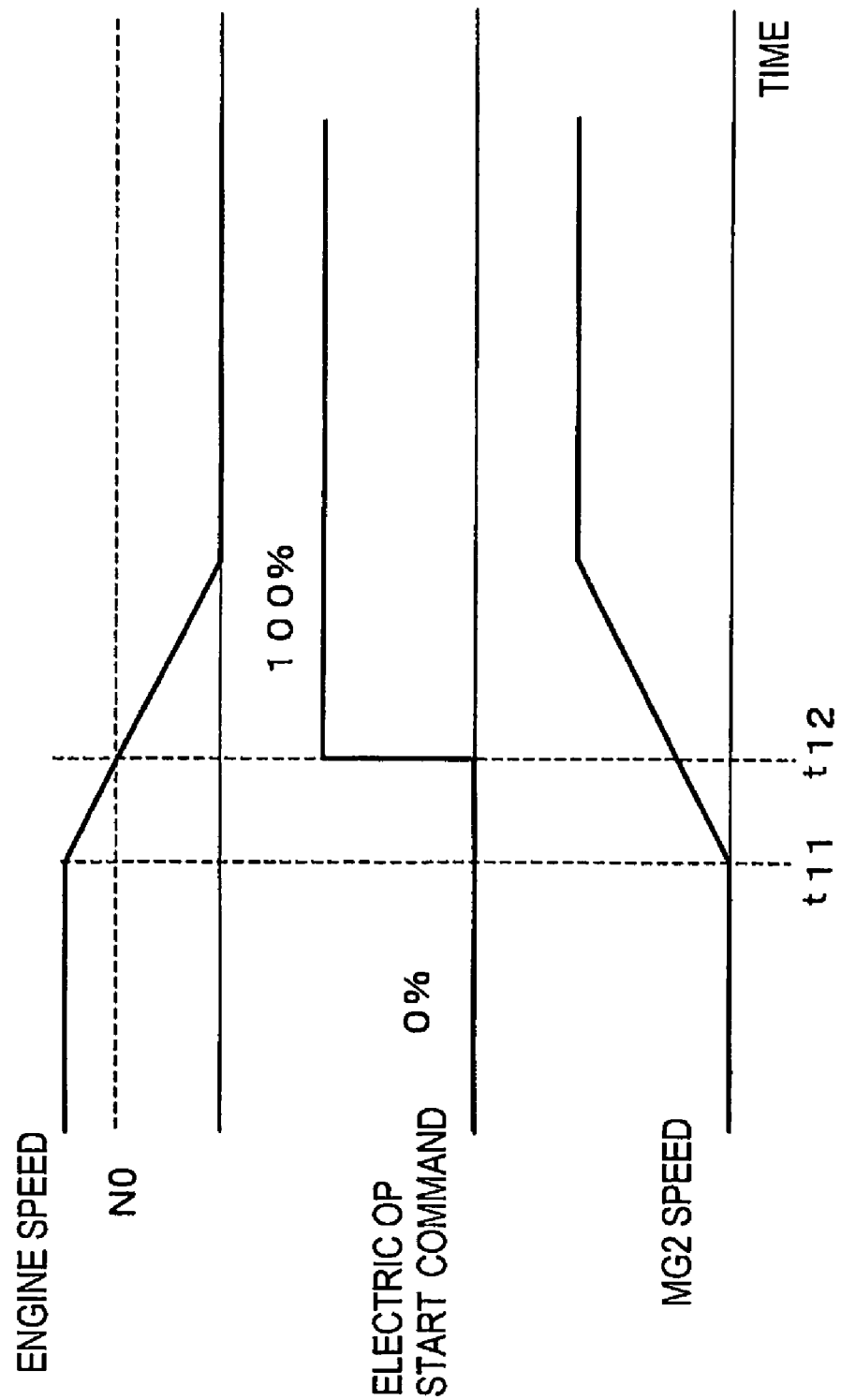
FIG. 4 is a time chart for explaining a timing of a starting command of the electric oil pump and the change in the speed of a second motor generator when halting the engine.

The aforementioned halting control of the engine 10 and the starting control of the electric oil pump 33 are carried out mainly to avoid a depression of the oil pressure, and also to avoid the power loss. For example, those controls may be carried out together with a speed control of the second motor generator 5, as shown in FIG. 4. Specifically, the speed of the second motor generator 5 (i.e., a motor speed) is started to raise gradually, at the same time of starting to lower the speed of the engine 10 at a point of time t11 when the decision of EV running is satisfied so as to halt the engine 10. The speed of the engine 10 is still high at the time, and the mechanical oil pump 32 is generating the oil pressure. Therefore, the electric oil pump 33 is kept halted.

The speed of the mechanical oil pump 32 is dropped in accordance with the gradual drop of the engine speed, so as to reduce the discharging amount of the operating oil. Therefore, the electric oil pump 33 is controlled to ON state (i.e., a state where a command duty ratio is 100%) at a point of time t12 when the engine speed is lowered to a preset reference level N0. The preset reference level N0 for determining a starting instant of the electric oil pump 33 is set in accordance with an oil temperature. Specifically, if the oil temperature is high and a viscosity of the oil is low, a leakage of the oil in the hydraulic control system 31 is increased. Consequently, a required amount of the operating oil to maintain the predetermined oil pressure is increased in accordance with the oil temperature. Therefore, the higher the detected oil temperature is, the higher the aforementioned preset reference level N0 is to be set. Here, in case the engine speed is lower than the preset reference level N0 at the instant when the decision of EV running is satisfied, the electric oil pump 33 is started immediately.

Accordingly, if the control thus has been described with reference to FIG. 4 is carried out, the electric oil pump 33 is started just before the oil pressure established by the electric oil pump 33 becomes insufficient. Therefore, a time period when the electric oil pump 33 and the mechanical oil pump 32 are driven simultaneously is minimized as short as possible. As a result, the energy loss can be reduced or prevented without causing insufficiency of the oil pressure. Moreover, if the timing to start the electric oil pump 33 is varied in accordance with the oil temperature, it is possible to control the start of the electric oil pump 33 in consideration of the leakage of the oil. Therefore, the insufficiency of the oil pressure and the energy loss can be prevented or suppressed more effectively.

On the contrary, it is also possible to control to halt the engine 10 after confirming the buildup of the oil pressure by the electric oil pump 33. An example is shown in a time chart of FIG. 5. Specifically, the electric oil pump 33 is first controlled to ON state (e.g., a state where a command duty ratio is 100%), at the point of time t12 when the decision of EV running is satisfied. The speed or the current value of the electric oil pump 33 is detected to determine the buildup of the oil pressure of the electric oil pump 33. The build up of the oil pressure of the electric oil pump 33 is judged when the detected value reaches the preset value. This judgment can be made on the basis of the operating state of the electric oil pump 33 such as the speed or the current value and, more specifically, on the basis of the fact that the speed or the current value reaches the preset value. The halting control of the engine 10 and the starting control of the second motor generator 5 are commenced at a point of time t22 when the determination is satisfied.

Figure 5:
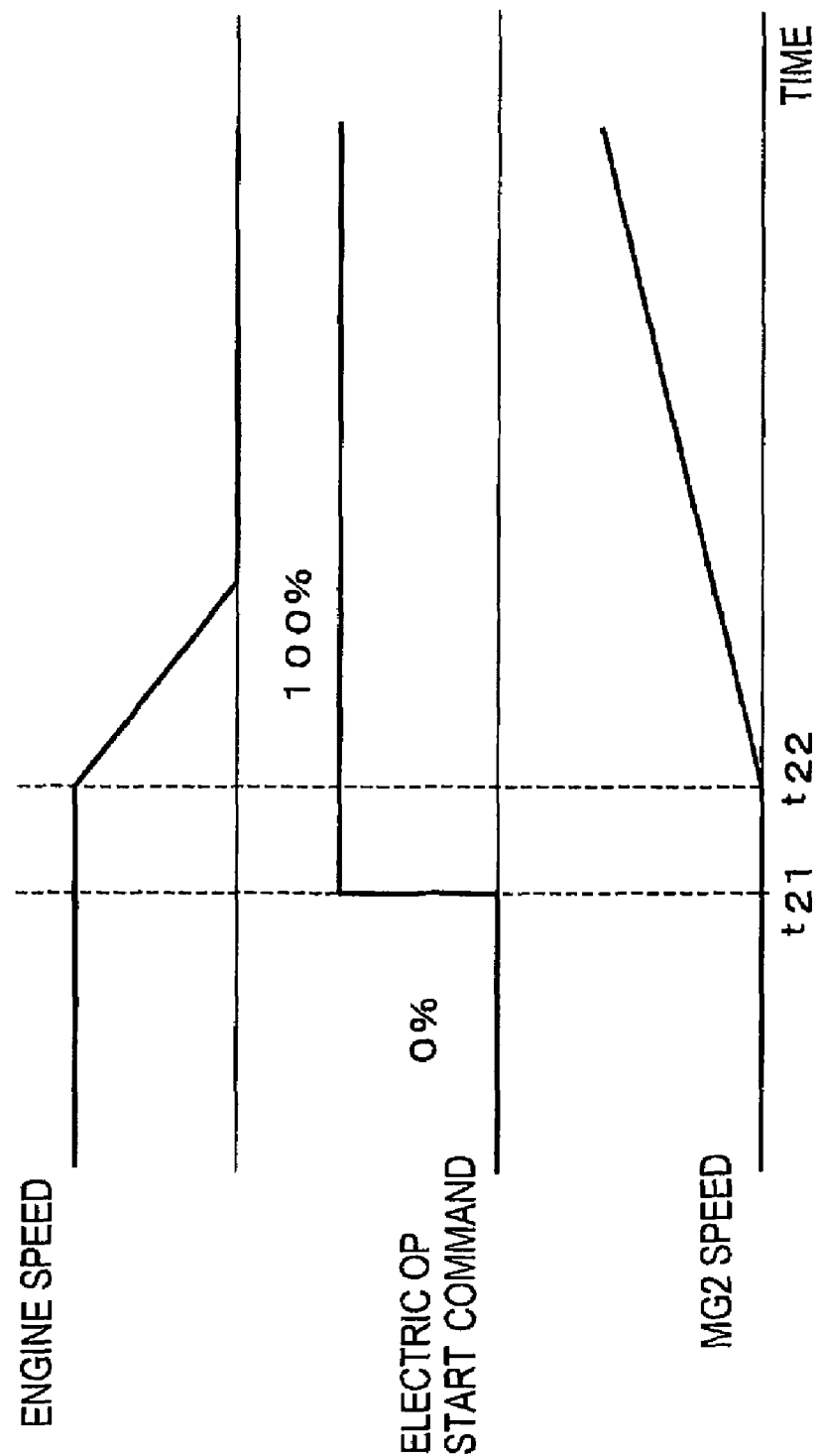
FIG. 5 is a time chart for explaining another timing of a starting command of the electric oil pump and the change in the speed of a second motor generator when halting the engine.

Accordingly, if the control thus has been described with reference to FIG. 5 is carried out, the electric oil pump 33 is started prior to halt of the engine 10, specifically, when the mechanical oil pump 32 is generating the oil pressure sufficiently, and the engine 10 is halted after the oil pressure is raised sufficiently. It is, therefore, possible to certainly avoid the situation in which the oil pressure becomes insufficient at a transient time to switch the oil pressure source from the mechanical oil pump 32 to the electric oil pump 33.

Figure 6:
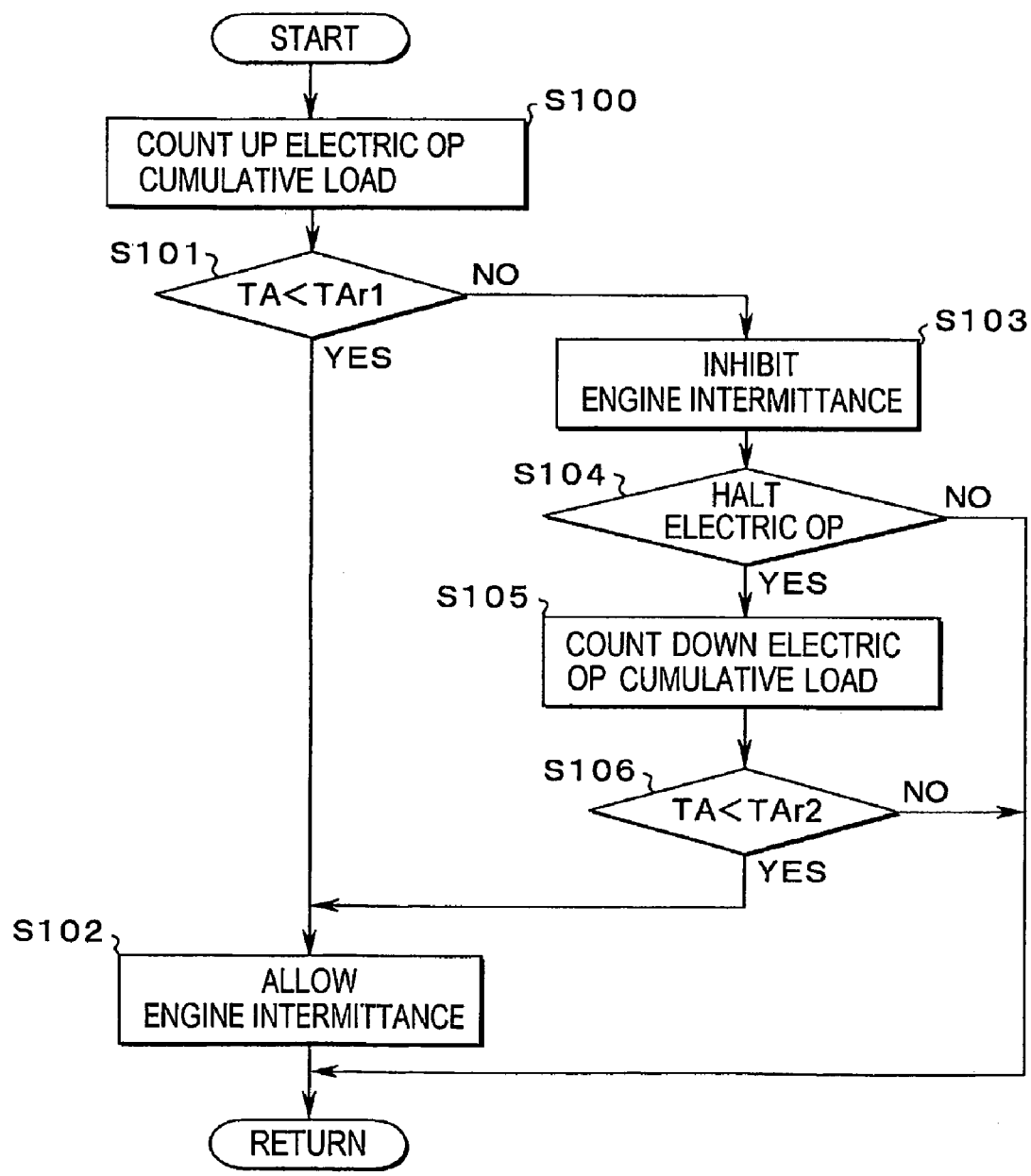
FIG. 6 is a flow chart for explaining a control example of allowing and inhibiting the halt of an engine on the basis of a cumulative load of the electric oil pump.

The aforementioned electric oil pump 33 is driven by a motor 33M. Therefore, a load acts on the motor 33M varies in accordance with the oil pressure to be generated by the electric oil pump 33 and the oil temperature. Accordingly, in order to drive the electric oil pump 33 efficiently without deteriorating its durability, it is desirable to control the hybrid drive unit by observing the operating state of the electric oil pump 33. In FIG. 6, there is shown a control example meeting with this technical demand. This example is constructed to accumulate the load on the electric oil pump 33 and to reduce a cumulative value thereof, in accordance with the operating state of the electric oil pump 33, so as to allow or not to allow the halt of the engine 10 on the basis of the cumulative value.

Specifically, a cumulative load TA of the electric oil pump (i.e., the electric OP) 33 is counted up (at Step S100) first of all. Here, the load of the electric oil pump 33 is a value set appropriately in accordance with the line pressure and the oil temperature. This value is set to higher value if the line pressure is high and the oil temperature is low. A routine shown in FIG. 6 is carried out every predetermined time period (i.e., every few millisecond to few tens of millisecond). If the electric oil pump 33 is driven, the load is counted up in each time and accumulated. Additionally, the load may also be counted up in every preset time other than the time interval to carry out the routine shown in FIG. 6.

Then, it is judged whether or not the cumulative load TA is smaller than a preset first threshold T Ar1 (at Step S101). The first threshold T Ar1 is a preset value to define an upper limit of a continuous drive of the electric oil pump 33. Accordingly, in case the answer of Step S101 is YES, the electric oil pump 33 is still in the condition possible to be driven in view of its temperature etc., so that the halt (or intermittent) of the engine 10 is allowed (at Step S102). This is because the oil pressure can be generated by driving the electric oil pump 33 even when the engine 10 is halted and the mechanical oil pump 32 stops generating the oil pressure.

On the contrary, in case the cumulative load TA is larger than the first threshold T Ar1 so that the answer of Step S101 is NO, a control to inhibit (not to allow) the halting (or intermittence) control of the engine 10 is carried out (at Step S103). Then, it is judged whether or not the electric oil pump 33 is halted (at Step S104). In short, it is judged whether or not the electric power is supplied to the electric oil pump 33.

In case the answer of Step S104 is NO, the routine is once ended. On the contrary, in case the answer of Step S104 is YES, the cumulative load of the electric oil pump 33 is counted down (at Step S105). Specifically, if the electric oil pump 33 is halted, the temperature thereof is gradually lowered by a natural heat radiation etc., so that a thermal condition returns gradually to a possible condition to be driven. As a result, the cumulative load decreases. Therefore, at Step S105, a preset value is subtracted from the cumulative load at a regular time interval. Here, the preset value to be subtracted may be determined on the basis of a heat radiating condition in view of a structure of an apparatus and its circumstances, and a length of a cycle time for counting.

It is judged whether or not the cumulative load TA thus reduced is smaller than a second threshold T Ar2 (at Step S106). The second threshold T Ar2 is set to such a value that no trouble is caused to the electric oil pump 33. Also, this value has a sufficient margin with respect to the upper limit of the cumulative load. Accordingly, in case the answer of Step S106 is NO, the cumulative load of the electric oil pump 33 is not reduced sufficiently so that the routine is once ended without restarting the driving of the electric oil pump 33. On the contrary, in case the answer of Step S106 is YES, it is possible to drive the electric oil pump 33, and the halt of the engine 10 is allowed (at Step S102).

The aforementioned first threshold T Ar1 is set on the basis of a heat rating of the electric oil pump 33 in use. The electric oil pump 33 is operated and halted repeatedly by carrying out the control shown in FIG. 6. Thus, the electric oil pump 33 can be continuously operated without exceeding an allowable use range which is set on the basis of the heat rating etc. As a result, a trouble such as a failure of the electric oil pump 33 can be prevented. In addition, malfunction of the transmission 6 can be prevented by ensuring the oil pressure of the hydraulic control system 31. Furthermore, the electric oil pump 33 is not operated excessively so that the durability thereof can be prevented from degrading.

Here, in case the viscosity of the oil is high, a resistance when pressurizing by the electric oil pump 33 is increased. Therefore, it is preferable to halt the driving of the electric oil pump 33 or to reduce the output thereof, by determining the condition of the load acting thereon. From this point of view, in FIG. 7, there is shown a control example to reduce the output of the electric oil pump 33 when the temperature is extremely low (e.g., below minus 20° C.), by determining the cumulative load of the electric oil pump 33.

Figure 7:
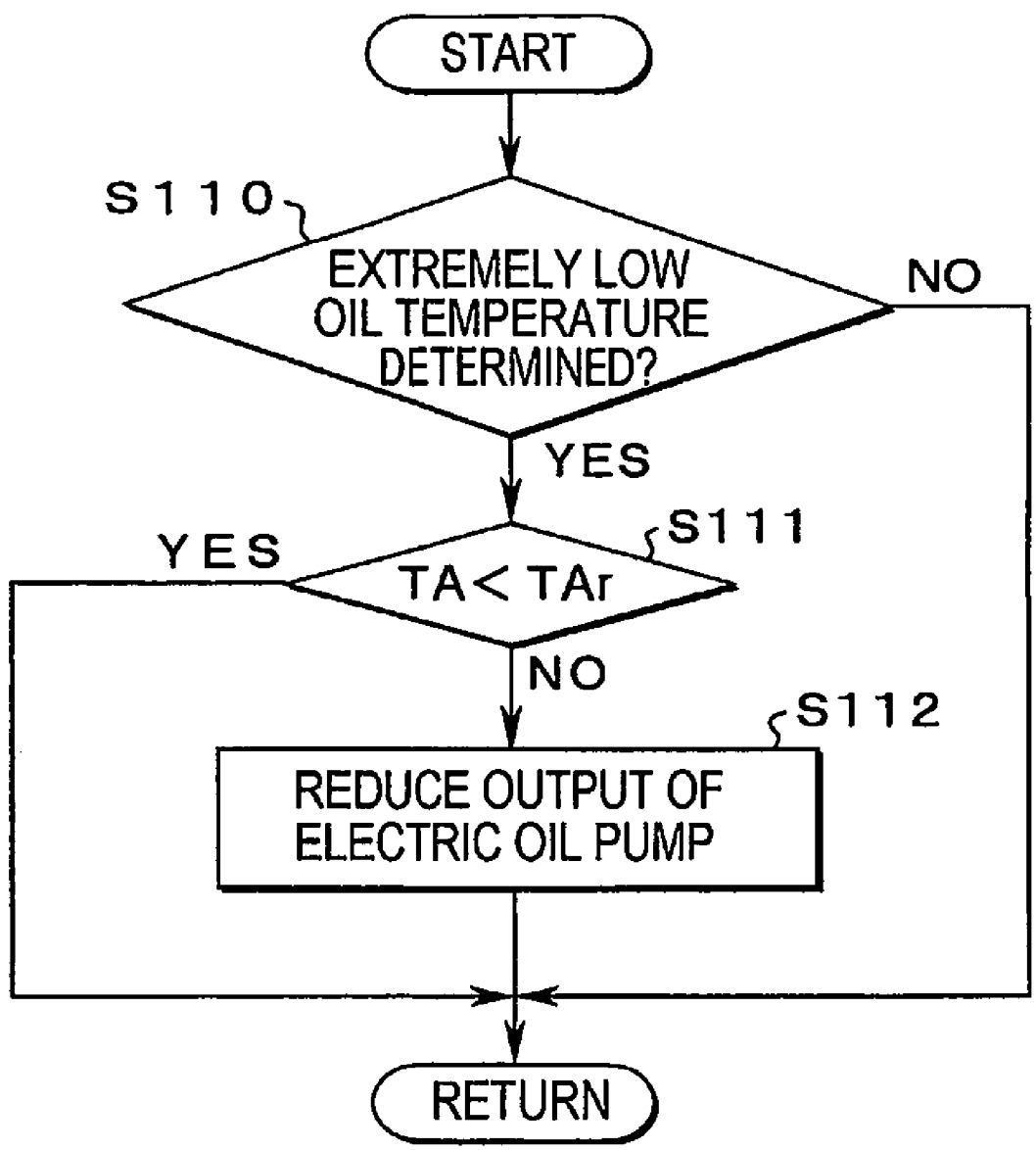
FIG. 7 is a flow chart for explaining a control example of the electric oil pump at an extremely cold temperature.

Specifically, in the control example shown in FIG. 7, a determination of the extremely low temperature is carried out first (at Step S110). If the determination is not satisfied so that the answer of Step S110 is NO, the routine is returned without carrying out any especial control. On the contrary, in case the answer of Step S110 is YES, it is judged whether or not the cumulative load TA is smaller than a preset threshold T Ar (at Step S111). This cumulative load TA may be a cumulative value of a value which is set in accordance with an oil temperature and an operating time, or may be merely a cumulative value of an operation continuing time. In case the cumulative load has not reached the threshold T Ar so that the answer of Step S111 is YES, the routine is returned. Namely, the continuous drive of the electric oil pump 33 is allowed.

On the contrary, in case the answer of Step S111 is NO, the cumulative load TA of the electric oil pump 33 has reached the threshold T Ar so that it is difficult to drive the electric oil pump 33 continuously. Therefore, the output of the electric oil pump 33 is reduced (at Step S112). Accordingly, the electric oil pump 33 will not be operated more than predetermined range, in case the viscosity of the oil is high so that a heavy load acts on the electric oil pump 33. Therefore, a failure of the electric oil pump 33 and deterioration in its durability can be prevented.

Here will be briefly described the relations between the aforementioned specific example and this invention. The functional means of Step S4 shown in FIG. 1 or the electronic control unit for providing the same function corresponds to the torque the torque limiting means of the invention; the functional means of Step S12 shown in FIG. 2 or the electronic control unit for providing the same function corresponds to the hydraulic pump driving means of the invention; and the functional means of Step S6 shown in FIG. 1 or the electronic control unit for providing the same function corresponds to the hydraulic pump halting means of the invention. Also, the functional means shown in FIG. 5 for carrying out the halting control of the engine 10 after the electric oil pump 33 is started, or the electronic control unit for providing the same function, corresponds to the halt control means of the invention. Moreover, the functional means shown in FIG. 1 for determining the buildup of the oil pressure of the mechanical oil pump 32 on the basis of the operating state of the electric oil pump 33 at Step S3, or the electronic control unit for providing the same function corresponds to the hydraulic pump drive determining means of the invention. Furthermore, the functional means of Step S100 shown in FIG. 6 or the electronic control unit for providing the same function corresponds to the load accumulating means of the invention, and the functional means of Steps S102 and S103 or the electronic control unit for providing the same function correspond to the drive control means of the invention.

Here, this invention should not be limited to the specific examples thus far described. The construction of the hybrid drive unit may be a construction other than that illustrated in FIG. 8. In short, a fundamental requirement for the hybrid drive unit is to comprise the hydraulic pump driven by the first prime mover, and the hydraulic pump driven by the electric motor.

INDUSTRIAL APPLICABILITY

This invention can be utilized in the field for manufacturing vehicles having the internal combustion engine and the motor, and in the field for manufacturing parts for this kind of vehicles.

The invention claimed is:

1. A control system for a hybrid vehicle, in which a second prime mover is connected to an output member to which a power is transmitted from a first prime mover through a transmission in which a torque capacity is varied in accordance with an oil pressure, and which has a first hydraulic pump driven by the first prime mover for establishing an oil pressure to be fed to the transmission, and a second hydraulic pump arranged in parallel with the first hydraulic pump and driven by an electric motor, comprising:

a torque limiting means for limiting an output torque of the second prime mover temporarily, at a starting time of the first prime mover.

2. The control system for a hybrid vehicle according to claim 1, further comprising:

a hydraulic pump driving means for driving the second hydraulic pump when the first prime mover is halted.

3. The control system for a hybrid vehicle according to claim 2, wherein the first prime mover includes an internal combustion engine which is started by carrying out a motoring by an external force, and further comprising a hydraulic pump halting means for halting the second hydraulic pump after a complete combustion in the internal combustion engine is determined.

4. The control system for a hybrid vehicle according to claim 1, further comprising:

a halt control means for halting the first prime mover subsequent to driving of the second hydraulic pump, in case of halting the first prime mover when the transmission is set to a predetermined torque capacity by the oil pressure fed from the first hydraulic pump.

5. The control system for a hybrid vehicle according to claim 1, further comprising:

a hydraulic pump drive determining means for determining a change in a driving state of the first hydraulic pump resulting from shifting of the first prime mover from a halting state to the driving state, on the basis of an operating state of the second hydraulic pump.

* * * * *